Nov. 1, 1932.  A. C. PETERSON  1,886,301
AIR BRAKING MEANS
Filed Dec. 7, 1926  2 Sheets-Sheet 2
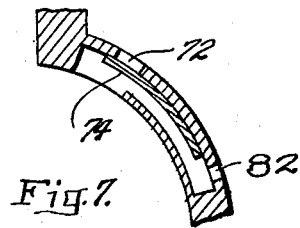
Fig. 7.
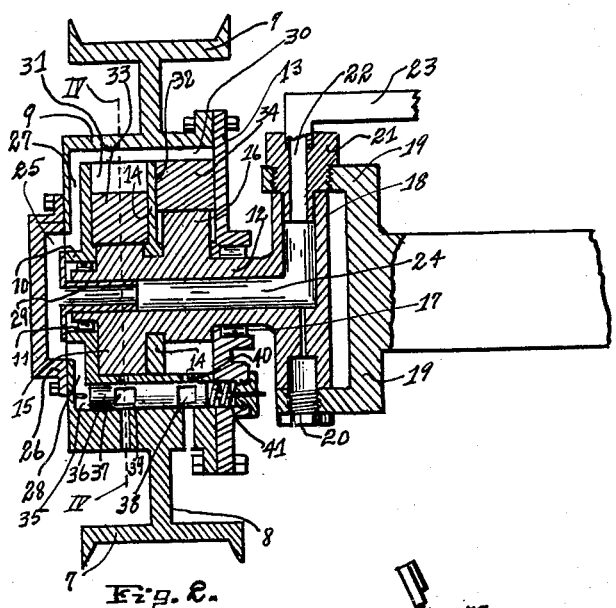
Fig. 2.
Fig. 4.
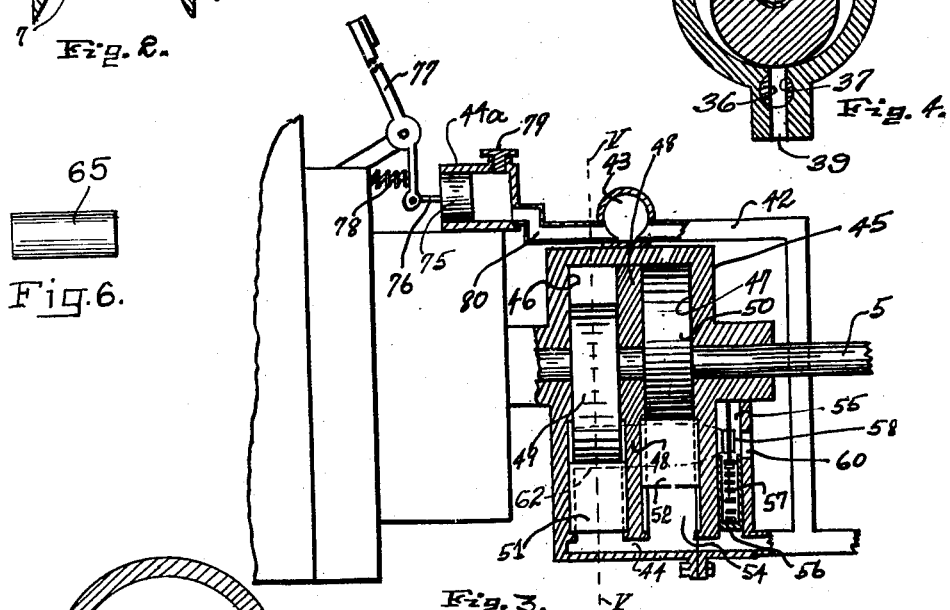
Fig. 6.
Fig. 3.
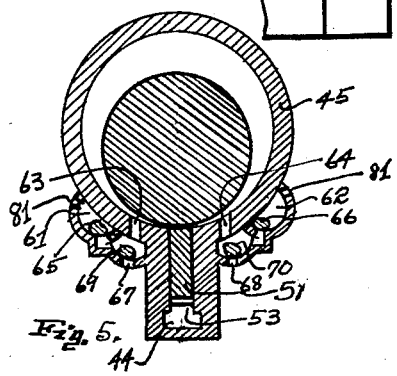
Fig. 5.
Inventor
Adolph Peterson.

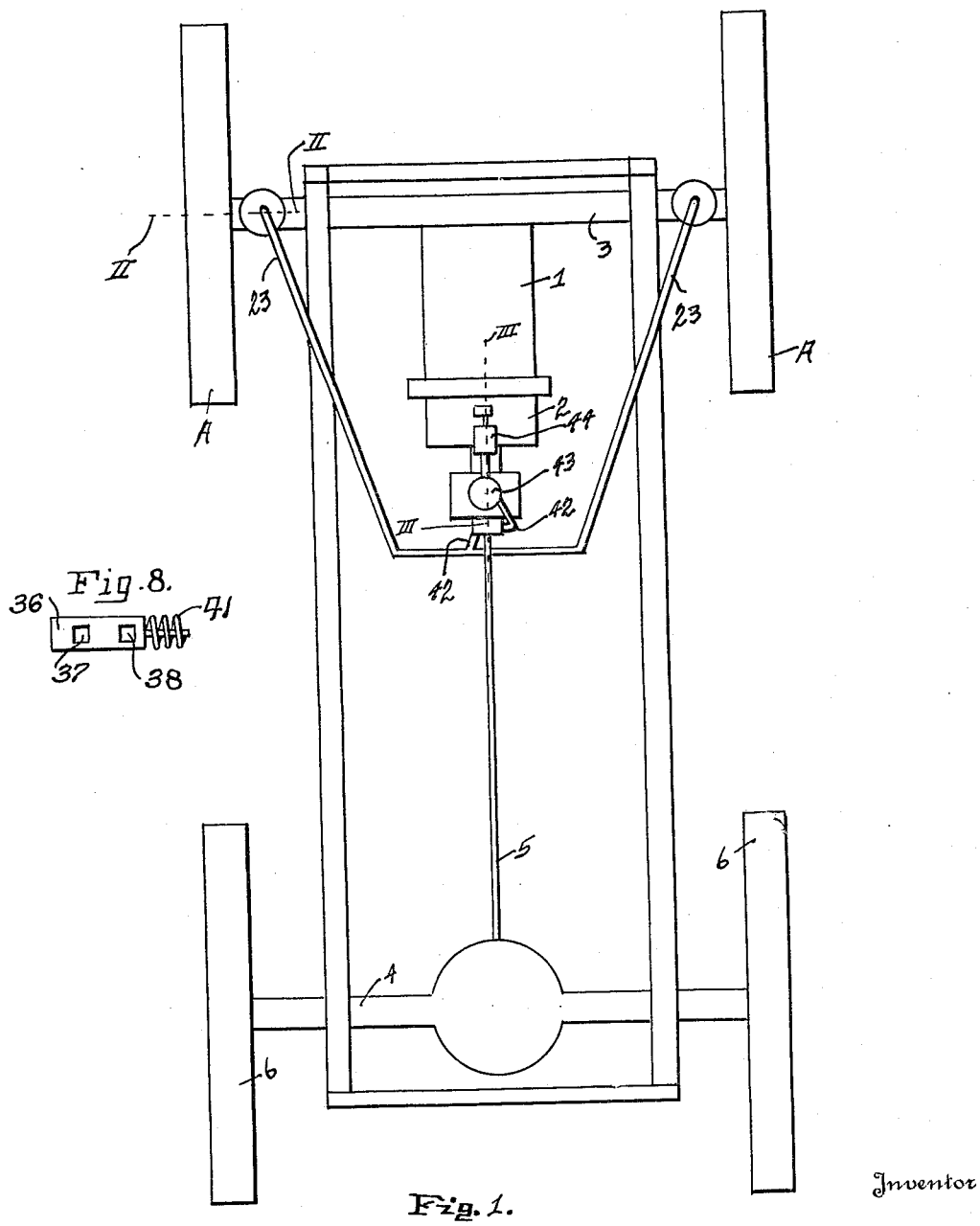

Patented Nov. 1, 1932

1,886,301

UNITED STATES PATENT OFFICE

ADOLPHE C. PETERSON, OF MINNEAPOLIS, MINNESOTA

AIR BRAKING MEANS

Application filed December 7, 1926. Serial No. 153,197.

My invention relates to braking means and particularly to a brake means in which air is the principal actuating element and it is therefore called air braking means.

The principal objects of my invention are to provide an air braking means which eliminates some of the troubles or difficulties of the usual braking means, in particular that it is self energizing or easily operated, that it is continuously and adequately cooled and that it is essentially nonwearing in its parts. The principal objects as above described are further procured in a device which is an improvement in braking means in that it is cheaply constructed, simple in construction, simple in operation and is almost free from maintenance expense. Other objects in my invention are to provide a braking means that is powerful in action while light in weight, which is effective with undiminished efficiency for long braking periods as in long descents of an automobile vehicle, which is well balanced on several wheel units, and which may be applied effectively to passenger vehicles, busses, trucks or railway vehicles. In general the object is to provide an improved braking means.

In the accompanying drawings which illustrate my invention, like characters refer to like parts throughout the several views. The principal devices and combinations of devices comprising my invention are as hereinafter described and as defined in the claims.

Referring to the drawings:

Figure 1 is a plan view of a vehicle having my device applied, this view showing the device diagrammatically only to illustrate the application of the parts to a vehicle as an automobile, the parts of the device being more particularly shown in the other views.

Figure 2 is a section on a vertical plane through one of the front road wheels through the axis of the wheel showing the application of one of the wheel braking units to a road wheel, a front wheel, this section being in particular on the line II—II of Figure 1.

Figure 3 is a section on the line III—III of Figure 1 this section being on a vertical plane through the braking unit applied to the propeller shaft of the vehicle.

Figure 4 is a section on a plane at right angles to the plane of Figure 2 on the line IV—IV of Figure 2.

Figure 5 is a section on the line V—V of Figure 3, this section being at right angles to the plane of Figure 3 and being through one of the eccentric rotors of the braking unit on the transmission or propeller shaft.

Figure 6 is a longitudinal view of the roller type valve 65.

Fig. 7 is enlarged detail view of valve 74 and related parts. Valve 73 and its related parts are substantially similar.

Fig. 8 is view of valve 36 looking from above it as shown in Fig. 2.

Referring again the drawings, the numeral 1 indicates an engine of an automobile, the numeral 2 the transmission, 3 the front axle, 4 the rear axle of the usual kind, that is having gears whereby rotation of propeller shaft 5 is transmitted to the rear road wheels 6. The gears or shaft within the rear axle 4 are not shown except by the illustration diagrammatically of the rear axle, as the construction of that rear axle is immaterial except that it contains the usual driving means transmitting driving power from the propeller shaft 5 to the rear road wheels 6. The front axle has road wheels designated each as A in Figure 1. One of these front road wheels is shown in detail in Figure 2, the parts there being otherwise designated. Each of these front road wheels has a braking unit applied of the character shown in Figures 2 and 4.

Describing now one of the front road wheels and its applied braking unit, the numeral 7 indicates a wheel rim to which any pneumatic tire or other tire may be applied in the usual manner or in any manner. The rim 7 is integrally constructed or cast with a wheel disk 8 and with a cylindrical housing 9 which latter may be six to ten inches in diameter as constructed for the ordinary private passenger car but would perhaps be larger when constructed for a buss for public passenger carrying. The housing 9 has integrally constructed or cast with it an outside bearing sleeve 10 which by means of rollers 11 is revolubly mounted upon the end of the axle spindle 12. The parts 7, 8, 9, 10, are preferably integrally cast of some light weight alloy as duralumin or a magnesium alloy or aluminum and are of such thickness that they are relatively rigid. The housing 9 has secured upon its inside end or face, after assembly of the parts, a head or end piece 13 which is also cast of a light weight alloy preferably. The housing 9 has stationed within it and in fixed relation to it, being secured by screws or welding or in any manner, a so-called division wall 14, which is preferably or may be formed in two parts, to enable assembling of the parts, and which performs the function of dividing the chamber formed within the housing 9 into two parts or chambers separated from each other within which eccentric pistons 15, and 16 respectively are relatively revolubly located. The eccentric pistons 15, 16 are forged and machined integrally with the spindle 12 or may be separately formed and applied by shrinking or otherwise fixed securely upon the spindle 12. The interiors of the two chambers of the housing 9 are cylindrical in shape, but the eccentric pistons being eccentric to the spindle 12 and eccentric to the cylindrical interior of the housing are therefore so situated that each eccentric piston in its respective chamber has its most eccentric edge or face as closely to the interior bore of the related chamber of the housing as may be without friction of the pistons against the bore of the housing 9. The two eccentric pistons 15, 16 are located 180 degrees apart, that is one 180 degrees ahead of the other. The inside face piece 13 is mounted by rollers 17 revolubly upon the spindle 12 at its inside part. The spindle 12 has a vertical part 18 integrally forged with it, this being preferably of steel, and this vertical part 18 is pivotally mounted in the forked axle end 19 by means of a lower bearing bolt 20 and an upper bearing bolt 21. The upper bearing bolt 21 has a conduit 22 formed in it and which is connected by a flexible conduit 23 with an operating means or controlling means as hereinafter described.

The upper bearing bolt 21 is not revolvable with respect to the axle end 19 but its lower end has the spindle part 18 revolvable upon it and the conduit 22 forms communication between the flexible conduit 23 and conduit 24 in the spindle 12 and by means of a conduit 25 in a so-called cover plate 26 with conduits 27 and 28 in the housing 9. The cover plate 26 as shown is bolted to the housing 9 and revolves with the latter and has extending axially inwardly within the conduit 24 of spindle 12 a cylindrical part 29 wherein conduit 25 passes.

The conduit 27 communicates with a conduit or passage 30 extending in the wall of the housing parallel with the axis of the spindle 12. The passage 30 is open to two rectangular relatively thin chambers 31, 32 wherein are slidably mounted respectively, so-called piston blocks 33, 34. The piston block 33 is adapted to abut, under certain conditions against one of the eccentric pistons and the other piston block 34 is adapted under the same conditions to abut against the face of the other eccentric piston. The chambers 31, 32 and their respective related piston blocks 33, 34 are located in a plane passing axially through the spindle 12 and the piston blocks are so closely fitted that they substantially prevent passage of any fluid or gas around them, or between the parts of the rotor chambers when they are in cooperation with the pistons as hereinafter described, but they are still so fitted they may slide into their places against the faces of the pistons and be reciprocated by the latter in their active condition as hereinafter described. The piston blocks 33, 34 are however preferably so fitted that they will not slide out of their chambers against the pistons except under the control action or pressure as hereinafter described. The sides of the piston blocks, that is their side edges, slide in channels in the interior faces of the rotor chambers, as shown.

The conduit 28 communicates with a small cylindrical bore 35 within which is reciprocable a piston valve 36 the latter having ports or passages 37, 38 which respectively permit expulsion of air from the rotor chambers related to them, or suction of atmospheric air, except when they are moved to their extreme closed positions as hereinafter described under the extreme control pressure. The piston valve 36 is normally held so that the ports 37, 38 are in conjunction or in juxtaposition with the ports 39, 40 of the respective rotor chambers, by a spring 41 which latter is tensioned so as to provide the necessary graduated control as hereinafter described.

The flexible conduits 23 of the two front wheel braking units, each of which is substantially as above described, communicate with a common conduit 42, the latter communicating through an air balancing chamber 43 with a so-called master pump cylinder 44a and the common conduit 42 also communicates continuously with a passage 44 formed in the cylindrical housing 45 of a transmission or propeller shaft braking unit.

The housing 45 is divided into two rotor chambers 46, 47 by division wall 48 and has in the two rotor chambers eccentric rotors 49, 50 respectively, these rotors 49, 50 operating in the chambers 46, 47 substantially in the same manner as the wheel unit rotors operate in their chambers. The eccentric rotors 49, 50 are formed integrally with or secured to a propellor shaft 5. The eccentric rotors 49, 50 rotate with the propeller shaft and within their rotor chambers, whereas the eccentric pistons 15, 16 in the wheel units are stationary, that is non-revolvable, and their rotor chambers are fixed to revolve with their respective wheels. Piston blocks 51, 52 are reciprocably located in the chambers 53, 54 and are adapted to abut against their respective eccentric rotors, under the control action as hereinafter described but are normally, except when under the braking action located in their chambers so that they do not protrude into the rotor chambers. The chambers 53, 54 are connected with the passage 44 as shown and are adapted to be elevated against the rotors when there is pressure in the passage 44. The passage 44 communicates also with a small cylindrical bore 55 wherein is reciprocable a piston valve 56 which latter is controlled by spring 57 against pressure in passage 44. Piston valve 56 normally is lowered so that ports 58 are open and may therefore communicate through the bore 55 with the port 60 to atmosphere. Only one of the ports 58 is shown together with its connection with passage 62; the passage 61 has a similar connection and port located in bore 55 on approximately the same horizontal plane as the port 58 shown but on the opposite side of bore 55. Ports 58 communicate each with one of the valve chambers 61, 62 the latter being stationed one on each side of the piston block chambers. The valve chambers 61, 62 receive air delivered from the related rotor chambers of housing 45 through ports 63, 64 return flow being prevented by relatively long cylindrical roller shaped valves 65, 66. The rotor chambers may receive air from atmosphere through ports 67, 68 controlled by check valves 69, 70 the latter being also roller shaped as shown.

The housing 9 of each wheel unit has related to each rotor chamber thereof ports 71, 72 controlled by non-return flow flat or thin spring leaf valves 73, 74. The housing 9 of each wheel unit may be provided with both inlet and outlet port valves to each rotor chamber as is done in connection with the housing 45 but the method shown in connection with the wheel units is an alternative construction.

The master pump cylinder 44a has a cooperating reciprocable piston 75 which through connecting rod 76 is moved inwardly through the depression of pedal lever 77, the latter with the piston 75 being normally returned outwardly by the spring 78. This master pump construction is shown of the simplest construction it being noted that any construction may be used and any fluid replenishing means may be used, a screw cap 79 being the only means shown for maintaining a full supply of liquid in the conduits.

In the operation of my device, or use, the master pump cylinder and the conduit 80, the air chamber 43 and common conduit 42 and the flexible conduits 23 and the passages related to each piston block in the wheel units and each piston block in the housing 45 and each piston valve bore are filled with a liquid such as oil or glycerine or alcohol, preferably a lubricating oil of light fluid consistency being used. Castor oil may be used. The relation of the parts and the quantity of liquid in the conduits and passages must be such that when the pedal lever 77 is elevated and the piston 75 outwardly extended the liquid will have no pressure in the conduits and permit the piston blocks in both the wheel units and in housing 45 to remain in their chambers without movement radially inward into their respective rotor chambers and will also at the same time or in the same condition permit the piston valves to remain in the position whereby their controlled ports 39, 40 or 58 are open. In the inactive condition there is not sufficient pressure of liquid in the conduit system to thrust the piston blocks against the eccentric pistons and they will accordingly when once thrust outwardly, by the eccentric pistons or by centrifugal force, remain so. Under such conditions there is no braking action and the piston blocks 51, 52 or 33, 34 do not reciprocate and move into the chambers of the rotors against the eccentric piston or eccentric rotors even though the latter rotate relatively. The rotor chambers do not have liquid in them but merely have air and under such conditions, no braking, the eccentric rotors merely rotate relatively in their rotor chambers and the rotor chambers of the eccentric pistons rotate without any opposition of air and without any compression of the air in the rotor chambers. The slight leakage of oil from the control conduits permits lubrication of the rotor parts but does not ever fill them as any excess liquid over that for lubrication would be delivered out of the rotor chambers to the atmosphere.

If now it is desired to cause braking action upon the wheels, the operator depresses pedal lever 77 and thereby a pressure is formed within the control passages and against the piston blocks and the piston blocks are thereupon thrust out of their chambers against the eccentric rotors or eccentric pistons to such degree as the eccentric rotors or eccentric pistons permit, whatever position the latter are in. Thus the piston blocks are made to take their position against the pistons or rotors and thereby the eccentric pistons or rotors operating with the piston blocks cause suction of air from the atmosphere through the leaf valve controlled ports in the wheel units or through the roller valve controlled ports in the housing 45. At each revolution of any of the eccentric pistons or rotors when the piston or rotor has drawn air into the rotor chamber it is then compressed in the rotor chamber and causes restraint upon the eccentric piston or rotor and thereupon upon the wheel or the propeller shaft thereby causing braking effect. This braking effect is relatively little until the pressure of fluid in the liquid control conduits is increased by the operator's pressure upon the pedal lever until the piston valves 36 and 56 partly or wholly cover the ports whereby air may be delivered from the rotor chambers to the atmosphere and when these ports are completely covered the braking effect is very large both upon the wheel units and upon the propeller shaft since the air volume compressed is large and there is practically no escape of the air except through the very small pin holes 81 in the housing chamber 45, delivering from the rotor chambers therein, and through the very small pin holes 82 in each of the rotor chambers in the wheel units.

There is one pin hole related to each rotor chamber, that is, one delivering from each rotor chamber both in the wheel units and in the housing 45, delivering independently to the atmosphere but these pin holes are so small that they merely permit some small delivery of the compressed air to atmosphere in the case of complete braking so that there is constantly some small intake of new air to cool the device and so that the wheel units would not be completely stalled by the air braking means, that is so that if the braking effect were so great that slippage of the wheels or a wheel upon the road surface would result, then in that case this small delivery of air to the atmosphere would permit just such yielding thereafter that the road wheel might again grip upon the road surface and thereby restore traction or grip upon the road surface of the wheel. This small pin-hole release of air may however be omitted if desired. This pin-hole release is not absolutely essential for cooling since in the case of complete braking effect the vehicle would very quickly be brought to a complete stop and therefore no cooling effect is in the case of complete braking necessary. In the case of partial braking the constant intake of fresh air from the atmosphere, during braking, and the compression of this air and delivery of this air, as heated, again to the atmosphere results in delivering most of the heat of braking with the heated and compressed air constantly to the atmosphere. This cooling effect, when air is so constantly taken in and delivered to the atmosphere is especially effective during descent of long hills to secure effective braking without detrimental heating of the braking means, as would be the case with the ordinary friction braking means. It is to be noted that the wheel braking units do not have the automatic or check valve controlled ports delivering to the atmosphere it being contemplated that the delivery through the ports which are constantly open (except when the piston valves shut them) is sufficient since when these ports are so open, for light braking, about half the air taken in is delivered to the atmosphere without compression and then compression commences, it being noted that then compression commences, and that in the case of greater braking effect, as procured by the liquid pressure control of the piston valves which shut these half-way ports, the entire or substantially the entire volume of air taken in may be compressed.

While I have shown particular devices and combinations of devices in the illustration of my device I contemplate that other detailed devices and combinations of devices may be used in the realization of my device without departing from the spirit and contemplation thereof.

What I claim is:

1. A wheel having secured thereto one element of an air compressing means, another element of the air compressing means fixed stationary, a port whereby the air compressing means may receive air under inspiration by relative action of the elements of the air compressing means, a port whereby the air compressing means may exhaust air to the atmosphere, and a means whereby the exhaust to the atmosphere may be controlled.

2. A pair of cylindrical chambers and cooperating eccentric elements, a pair of slide blocks adapted to be brought into contact with the eccentric elements by liquid pressure, the oscillation of the parts being such under action that movement of one slide block is so balanced by the movement of the other slide block that a common liquid pressure maintains the slide blocks in contact with the two eccentric elements.

3. A braking means comprising a pair of cylindrical chambers and cooperating eccentric elements, a pair of slide blocks adapted to be brought into contact with the eccentric elements by liquid pressure, the oscillation of the parts being such under action that movement of one slide block is so balanced by the movement of the other slide block that a common liquid pressure maintains the slide blocks in contact with the two eccentric elements.

4. A braking means comprising a pair of cylindrical chambers and cooperating eccentric elements, a pair of slide blocks adapted to be brought into contact with the eccentric elements by liquid pressure, the oscillation of the parts being such under action that movement of one slide block is so balanced by the movement of the other slide block that a common liquid pressure maintains the slide blocks in contact with the eccentric elements, a fluid in the chambers creating resistance against the eccentric elements under braking action, and a control means regulating the liquid pressure against the slide blocks to effect their contact with the eccentric elements under braking action.

5. A plurality of cylindrical chambers and cooperating eccentric elements, a plurality of slide blocks adapted to be brought into contact with the eccentric elements by liquid pressure, the cyclic action of the eccentric elements being such under actuation that the slide blocks have such cyclic alternated and balanced movement that a common liquid pressure maintains the slide blocks in contact with the eccentric elements.

6. A plurality of cylindrical chambers and cooperating eccentric elements each in a related one of the cylindrical chambers and fixed upon a rotatable shaft, a plurality of slide blocks one related to each eccentric element, slidable in a related guide and adapted to be brought into contact with the eccentric element by liquid pressure, a common source of liquid pressure acting upon the slide blocks, the cyclic action of the eccentric elements being such under actuation that the slide blocks have such cyclic alternated and balanced movement that the common liquid pressure maintains the slide blocks in contact with the eccentric elements.

7. A plurality of cylindrical chambers and cooperating eccentric elements each in a related one of the cylindrical chambers and fixed upon a rotatable shaft, a plurality of slide blocks one related to each eccentric element slidable in a related guide and adapted to be brought into contact with the eccentric element by liquid pressure, a common source of liquid pressure acting upon the slide blocks, the cyclic action of the eccentric elements being such under actuation that the slide blocks have such cyclic alternated and balanced movement that the common liquid pressure maintains the slide blocks in contact with the eccentric elements, and means for relieving the liquid pressure to permit the slide blocks to become inactive.

In witness whereof I have hereunto set my hand this 7th day of December, 1925.

ADOLPHE C. PETERSON.